US012617062B2

(12) United States Patent
Palm

(10) Patent No.: US 12,617,062 B2
(45) **Date of Patent: *May 5, 2026**

(54) POWER TOOL SENSING A MULTI-POLE MAGNET JUNCTION

(71) Applicant: MILWAUKEE ELECTRIC TOOL CORPORATION, Brookfield, WI (US)

(72) Inventor: Andrew R. Palm, Glendale, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/956,339

(22) Filed: Nov. 22, 2024

(65) Prior Publication Data

US 2025/0083292 A1 Mar. 13, 2025

Related U.S. Application Data

(63) Continuation of application No. 18/348,858, filed on Jul. 7, 2023, now Pat. No. 12,186,870.

(Continued)

(51) Int. Cl.

*B25C 5/15* (2006.01)
*B25C 1/00* (2006.01)
*B25C 1/06* (2006.01)

(52) U.S. Cl.

CPC ................ *B25C 5/15* (2013.01); *B25C 1/008* (2013.01); *B25C 1/06* (2013.01)

(58) Field of Classification Search

CPC .............. B25C 5/15; B25C 1/008; B25C 1/06

See application file for complete search history.

(56) References Cited

U.S. PATENT DOCUMENTS 5,323,946 A 6/1994 O'Connor et al.
5,473,805 A 12/1995 Wille (Continued)

FOREIGN PATENT DOCUMENTS

CN 100393447 C 6/2008
CN 102000760 A 4/2011

(Continued)

OTHER PUBLICATIONS

Gesipa, "Blind Riveting Tools," Spare Parts Programme, Apr. 1, 2008 (4 pages).

(Continued)

*Primary Examiner* — Nathaniel C Chukwurah

(74) *Attorney, Agent, or Firm* — Michael Best & Friedrich LLP

(57) ABSTRACT

A powered fastener driver includes a motor and a lifter configured to be rotatable by the motor about a rotational axis. The powered fastener driver also includes a piston urged towards a bottom-dead-center position to drive the fastener into a workpiece, and a magnet coupled to the lifter for rotation with the lifter. The magnet includes a first pair of poles including a first north pole face and a first south pole face, and a second pair of poles including a second north pole face and a second south pole face. The first north pole face is adjacent the second south pole face. A pole junction is defined between the first pair of poles and the second pair of poles. The powered fastener driver also includes a sensor configured to detect the pole junction, and a controller configured to control the motor based on detection of the pole junction.

20 Claims, 8 Drawing Sheets

Related U.S. Application Data

(60) Provisional application No. 63/359,534, filed on Jul. 8, 2022.

(56) References Cited

U.S. PATENT DOCUMENTS

| | | | |
|---|---|---|---|
| 5,605,070 | A | 2/1997 | Wille |
| 5,960,667 | A | 10/1999 | Hylwa et al. |
| 6,018,978 | A | 2/2000 | Aniento |
| 6,026,551 | A | 2/2000 | Honsel et al. |
| 6,141,849 | A | 11/2000 | Honsel et al. |
| 6,145,360 | A | 11/2000 | Honsel et al. |
| 6,163,945 | A | 12/2000 | Amano et al. |
| 6,182,345 | B1 | 2/2001 | Travis |
| 6,212,931 | B1 | 4/2001 | Solfronk |
| 6,272,899 | B1 | 8/2001 | Bentivogli |
| 6,276,037 | B1 | 8/2001 | Solfronk |
| 6,301,948 | B1 | 10/2001 | Weiland |
| 6,367,139 | B2 | 4/2002 | Wille |
| 6,425,170 | B1 | 7/2002 | Zirps et al. |
| 6,622,363 | B2 | 9/2003 | Komsta |
| 6,629,360 | B2 | 10/2003 | Ohuchi |
| 6,637,099 | B1 | 10/2003 | Seewraj |
| 6,684,470 | B1 | 2/2004 | Joux |
| 6,883,216 | B2 | 4/2005 | Gilbert et al. |
| 6,886,226 | B1 | 5/2005 | Dear et al. |
| 6,904,831 | B2 | 6/2005 | Aasgaard |
| 6,907,648 | B2 | 6/2005 | Eldessouky |
| 6,907,649 | B2 | 6/2005 | Yamada |
| 6,918,279 | B2 | 7/2005 | Wille |
| 6,925,695 | B2 | 8/2005 | Woyciesjes et al. |
| 7,040,010 | B2 | 5/2006 | Bouman |
| 7,043,807 | B2 | 5/2006 | Woyciesjes et al. |
| 7,082,657 | B1 | 8/2006 | Lin |
| 7,140,227 | B2 | 11/2006 | Bouman et al. |
| 7,159,291 | B2 | 1/2007 | Ohuchi |
| 7,322,783 | B2 | 1/2008 | Pearce et al. |
| 7,331,205 | B2 | 2/2008 | Chitty et al. |
| 7,346,971 | B2 | 3/2008 | Chitty |
| 7,347,078 | B1 | 3/2008 | Hopkins et al. |
| 7,464,454 | B2 | 12/2008 | Aasgaard |
| 7,503,133 | B2 | 3/2009 | Muraoka |
| 7,503,196 | B2 | 3/2009 | Chitty et al. |
| 7,520,414 | B2 * | 4/2009 | Blessing ................... B25C 5/15 173/117 |
| 7,559,133 | B2 | 7/2009 | Chitty et al. |
| 7,698,794 | B2 | 4/2010 | Cobzaru |
| 7,712,209 | B2 | 5/2010 | Bouman et al. |
| 7,818,859 | B2 | 10/2010 | Pearce et al. |
| 8,015,699 | B2 | 9/2011 | Fulbright |
| 8,091,195 | B2 | 1/2012 | Lin |
| 8,099,846 | B2 | 1/2012 | King et al. |
| 8,109,123 | B2 | 2/2012 | Chen |
| 8,151,423 | B2 | 4/2012 | Dear et al. |
| 8,161,622 | B2 | 4/2012 | King et al. |
| 8,256,104 | B2 | 9/2012 | Fulbright |
| 8,365,375 | B2 | 2/2013 | Lin |
| 8,443,512 | B2 | 5/2013 | Masugata |
| 8,474,119 | B2 | 7/2013 | Lv et al. |
| 8,615,860 | B2 | 12/2013 | Cobzaru et al. |
| 8,677,587 | B2 | 3/2014 | Liu |
| 8,677,588 | B2 | 3/2014 | Soller |
| 8,689,419 | B2 | 4/2014 | Lin |
| 8,707,530 | B2 | 4/2014 | Lin |
| 8,904,612 | B1 | 12/2014 | Lin |
| 8,935,948 | B1 | 1/2015 | Gregory |
| 9,079,240 | B2 | 7/2015 | Schiffler et al. |
| 9,180,510 | B2 | 11/2015 | Sugata et al. |
| 9,289,818 | B2 | 3/2016 | Skolaude |
| 9,302,381 | B2 * | 4/2016 | Kondou .................... B25C 1/00 |
| 9,440,340 | B2 | 9/2016 | Hsu et al. |
| 9,849,502 | B2 | 12/2017 | Gaertner et al. |
| 10,232,429 | B1 | 3/2019 | Lin et al. |
| 11,654,475 | B2 | 5/2023 | Killen |
| 12,186,870 | B2 * | 1/2025 | Palm ......................... B25C 1/06 |
| 2006/0150402 | A1 | 7/2006 | Lin |
| 2006/0179631 | A1 | 8/2006 | Lin |
| 2006/0180629 | A1 | 8/2006 | Lin |
| 2007/0295779 | A1 | 12/2007 | Fulbright |
| 2008/0012453 | A1 | 1/2008 | Aasgaard |
| 2008/0210060 | A1 | 9/2008 | Aasgaard |
| 2009/0031545 | A1 | 2/2009 | Keppel |
| 2009/0205184 | A1 | 8/2009 | Seewraj et al. |
| 2009/0236387 | A1 * | 9/2009 | Simonelli ............... B25F 5/006 227/8 |
| 2010/0071182 | A1 | 3/2010 | Ho et al. |
| 2010/0139066 | A1 | 6/2010 | Chen |
| 2010/0275424 | A1 | 11/2010 | Masugata |
| 2010/0295696 | A1 | 11/2010 | Chu |
| 2011/0271504 | A1 | 11/2011 | Preti |
| 2011/0289745 | A1 | 12/2011 | Ho |
| 2012/0104304 | A1 | 5/2012 | Lin |
| 2012/0240371 | A1 | 9/2012 | Mori |
| 2013/0117981 | A1 | 5/2013 | Seewraj et al. |
| 2013/0205577 | A1 | 8/2013 | Soller |
| 2013/0312245 | A1 | 11/2013 | Skolaude et al. |
| 2014/0100687 | A1 | 4/2014 | Ekstrom et al. |
| 2014/0101908 | A1 | 4/2014 | Cobzaru et al. |
| 2014/0224831 | A1 | 8/2014 | Naughton et al. |
| 2014/0250649 | A1 | 9/2014 | Masugata |
| 2015/0040373 | A1 | 2/2015 | Chen |
| 2015/0044964 | A1 | 2/2015 | Khan et al. |
| 2015/0074964 | A1 | 3/2015 | Masugata |
| 2015/0336159 | A1 | 11/2015 | Gaertner et al. |
| 2015/0360355 | A1 | 12/2015 | Hsu et al. |
| 2016/0045950 | A1 | 2/2016 | Gaertner et al. |
| 2016/0107224 | A1 | 4/2016 | King |
| 2016/0114383 | A1 | 4/2016 | Honsel |
| 2019/0351477 | A1 | 11/2019 | Yabguchi et al. |
| 2020/0130047 | A1 | 4/2020 | Yabunaka et al. |
| 2020/0142010 | A1 | 5/2020 | Chowdhury et al. |
| 2020/0171632 | A1 | 6/2020 | Dey, IV et al. |
| 2021/0347023 | A1 | 11/2021 | Carrier et al. |
| 2022/0105616 | A1 | 4/2022 | Wirnitzer et al. |

FOREIGN PATENT DOCUMENTS

| | | | |
|---|---|---|---|
| CN | 101579717 | B | 5/2011 |
| CN | 202087763 | U | 12/2011 |
| CN | 102225453 | B | 1/2013 |
| CN | 203091652 | U | 7/2013 |
| CN | 204247901 | U | 4/2015 |
| CN | 105414439 | A | 3/2016 |
| DE | 29914202 | U1 | 12/2000 |
| DE | 20104373 | U1 | 6/2001 |
| DE | 10115728 | A1 | 10/2001 |
| DE | 202004004148 | U1 | 7/2004 |
| DE | 202004012268 | U1 | 12/2005 |
| DE | 202004012269 | U1 | 12/2005 |
| DE | 202006014607 | U1 | 11/2006 |
| DE | 202009001230 | U1 | 4/2009 |
| DE | 102008013044 | B3 | 7/2009 |
| DE | 202010007250 | U1 | 10/2010 |
| DE | 202012101490 | U1 | 5/2012 |
| DE | 10316578 | B4 | 6/2012 |
| DE | 202012101492 | U1 | 8/2012 |
| DE | 102011001198 | B4 | 11/2012 |
| DE | 102013219217 | A1 | 3/2015 |
| DE | 102013221789 | A1 | 4/2015 |
| DE | 102013221790 | A1 | 5/2015 |
| DE | 102013221792 | A1 | 5/2015 |
| DE | 102014223303 | A1 | 5/2016 |
| EP | 0927586 | A2 | 7/1999 |
| EP | 0787563 | B1 | 4/2002 |
| EP | 1297916 | A2 | 4/2003 |
| EP | 0928649 | B1 | 6/2003 |
| EP | 1300205 | B1 | 4/2005 |
| EP | 0927585 | B1 | 4/2006 |
| EP | 1232812 | B1 | 1/2007 |
| EP | 2113317 | A1 | 11/2009 |
| EP | 1738845 | B1 | 1/2013 |
| EP | 2321096 | B1 | 10/2014 |
| EP | 2823911 | A2 | 1/2015 |
| EP | 2626154 | B1 | 12/2015 |

(56) References Cited

FOREIGN PATENT DOCUMENTS

| | | | |
|---|---|---|---|
| EP | 2565469 | B1 | 3/2016 |
| FR | 2990634 | B1 | 2/2015 |
| FR | 3013999 | A1 | 6/2015 |
| JP | H11123664 | A | 5/1999 |
| JP | 2015033734 | A | 2/2015 |
| WO | WO0196045 | A1 | 12/2001 |
| WO | WO03078090 | A1 | 9/2003 |
| WO | WO2005025772 | A1 | 3/2005 |
| WO | WO2008099132 | A1 | 8/2008 |
| WO | WO2008119849 | A1 | 10/2008 |
| WO | WO2009007825 | A2 | 1/2009 |
| WO | WO2009072836 | A2 | 6/2009 |
| WO | WO2011060499 | A1 | 5/2011 |
| WO | WO2012120132 | A1 | 9/2012 |
| WO | WO2015049738 | A1 | 4/2015 |

OTHER PUBLICATIONS

Gesipa, "Blind Rivet Tools: Portable Electric Installation Tools," <https://web.archive.org/web/20060904084600/http://www.gesipausa.com/portable_installation_tools.htm> web page publicly available at least as early as Sep. 4, 2006.

File history of U.S. Appl. No. 17/338,297, filed Jun. 3, 2021 (104 pages including cover page).

International Search Report and Written Opinion for Application No. PCT/US2023/027134 dated Oct. 31, 2023 (13 pages).

* cited by examiner

POWER TOOL SENSING A MULTI-POLE MAGNET JUNCTION

CROSS-REFERENCE TO RELATED APPLICATIONS

This application is a continuation of U.S. patent application Ser. No. 18/348,858, filed on Jul. 7, 2023, now U.S. Pat. No. 12,186,870, which claims priority to U.S. Provisional Patent Application No. 63/359,534, filed on Jul. 8, 2022, the entire contents of both of which are incorporated herein by reference.

BACKGROUND

The present disclosure relates to a power tool, such as a powered fastener driver, and more particularly to a battery powered power tool.

There are various power tools known in the art. For example, fastener drivers are known in the art for driving fasteners (e.g., nails, tacks, staples, rivets, etc.) into a workpiece. These fastener drivers operate utilizing various means known in the art (e.g., compressed air generated by an air compressor, electrical energy, a flywheel mechanism, etc.), but often these designs are met with power, size, and cost constraints.

SUMMARY

In one aspect, the disclosure provides a powered fastener driver. The powered fastener driver includes a motor and a lifter configured to be rotatable by the motor about a rotational axis. The powered fastener driver also includes a piston urged towards a bottom-dead-center position to drive the fastener into a workpiece, and a magnet coupled to the lifter for rotation with the lifter. The magnet includes a first pair of poles including a first north pole face and a first south pole face, and a second pair of poles including a second north pole face and a second south pole face. The first north pole face is adjacent the second south pole face. A pole junction is defined between the first pair of poles and the second pair of poles. The powered fastener driver also includes a sensor configured to detect the pole junction, and a controller configured to control the motor based on detection of the pole junction.

In another aspect, the disclosure provides a powered fastener driver including a motor, a contact trip configured to be movable from a first position to a second position in response to engagement with a workpiece, and a magnet coupled to the contact trip for movement with the contact trip. The magnet includes a first pair of poles including a first north pole face and a first south pole face, and a second pair of poles including a second north pole face and a second south pole face. The first north pole face is adjacent the second south pole face. A pole junction is defined between the first pair of poles and the second pair of poles. The powered fastener driver also includes a sensor configured to detect the pole junction, and a controller configured to deactivate the motor to inhibit release of a fastener when the contact trip is in the first position based on detection of the pole junction.

In another aspect, the disclosure provides a powered fastener driver including a motor and a lifter configured to be rotatable by the motor about a rotational axis. The powered fastener driver also includes a piston urged towards a bottom-dead-center position to drive the fastener into a workpiece, a contact trip configured to be movable from a first position to a second position in response to engagement with the workpiece, and a first magnet coupled to the lifter for rotation with the lifter. The first magnet includes a first pair of poles, a second pair of poles, and a first pole junction therebetween. The powered fastener driver also includes a first sensor configured to detect the first pole junction, and a second magnet coupled to the contact trip for movement with the contact trip. The second magnet includes a third pair of poles, a fourth pair of poles, and a second pole junction therebetween. The powered fastener driver also includes a second sensor configured to detect the second pole junction, and a controller configured to stop the motor based on a position of the first pole junction and configured to deactivate the motor to inhibit release of a fastener based on a position of the second pole junction.

Other features and aspects of the disclosure will become apparent by consideration of the following detailed description and accompanying drawings.

DETAILED DESCRIPTION

Before any implementations of the disclosure are explained in detail, it is to be understood that the disclosure is not limited in its application to the details of construction and the arrangement of components set forth in the following description or illustrated in the following drawings. The disclosure is capable of other implementations and of being practiced or of being carried out in various ways. Also, it is to be understood that the phraseology and terminology used herein is for the purpose of description and should not be regarded as limiting.

Figure 1:
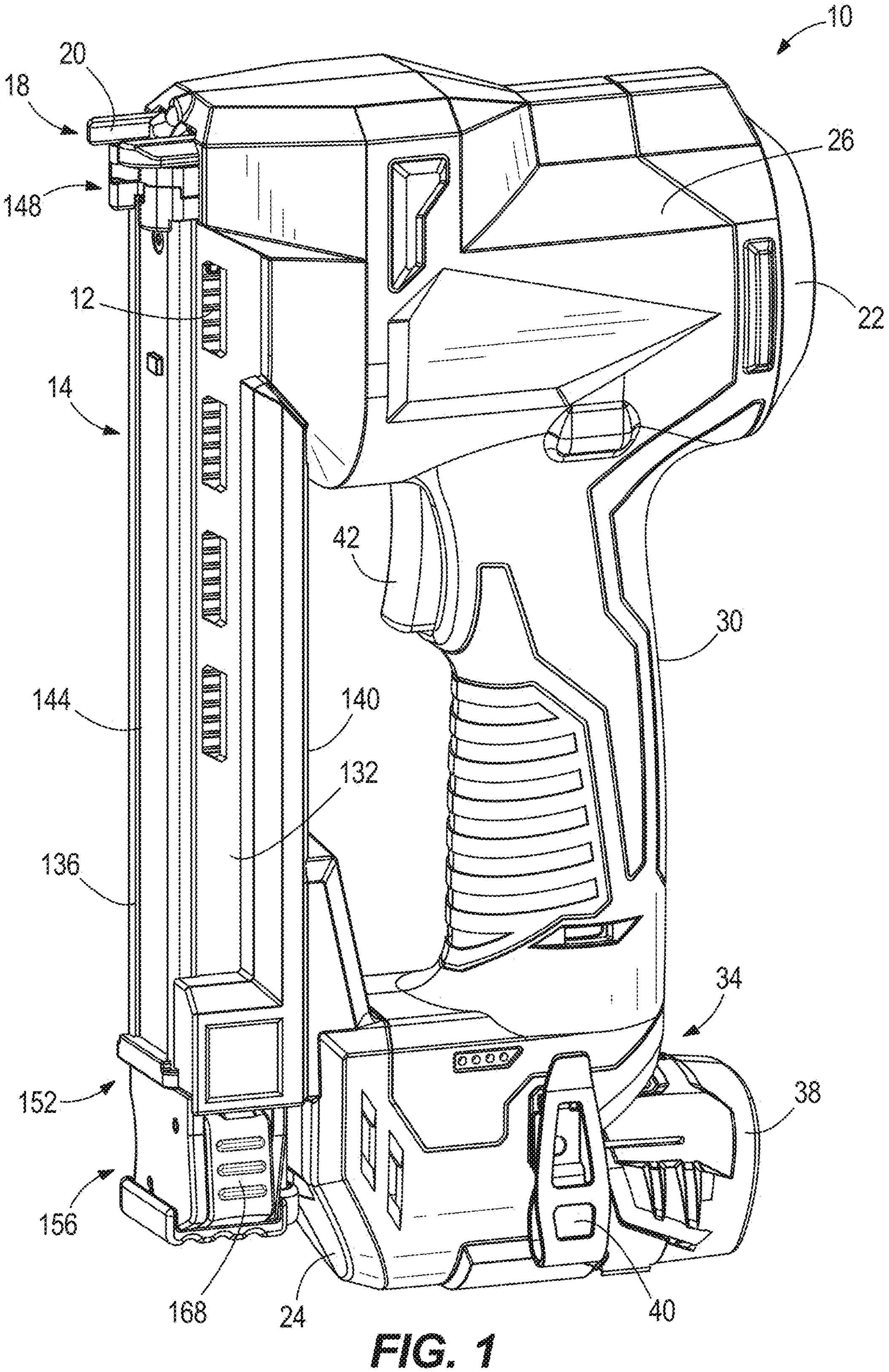
FIG. 1 is a perspective view of a powered fastener driver.

FIG. 1 illustrates a power tool, such as a powered fastener driver 10 (e.g., a cable stapler) for driving fasteners 12 (e.g., staples of a staple collation) held within a magazine 14 into a workpiece. The powered fastener driver 10 may also be used to drive nails, tacks, rivets, or other types of fasteners into a workpiece. The driver 10 includes a nosepiece 18 that sequentially receives the fasteners 12 from the magazine 14 prior to each fastener-driving operation. The nosepiece 18 includes a contact trip 20 that allows the driver 10 to be operated in a single shot mode. In some implementations of the driver 10, the contact trip 20 may permit operation in the single shot mode and/or a bump or continuous shot mode. The driver 10 includes a housing 22 defining a head portion 26, a handle portion 30, and a battery receptacle portion 34 that receives a battery pack 38. In the illustrated implementation, the housing 22 is longitudinally split at a parting line 24 into first and second housing portions. The driver 10 further includes a belt clip 40 secured to the housing 22 adjacent the battery receptacle portion 34.

Figure 2:
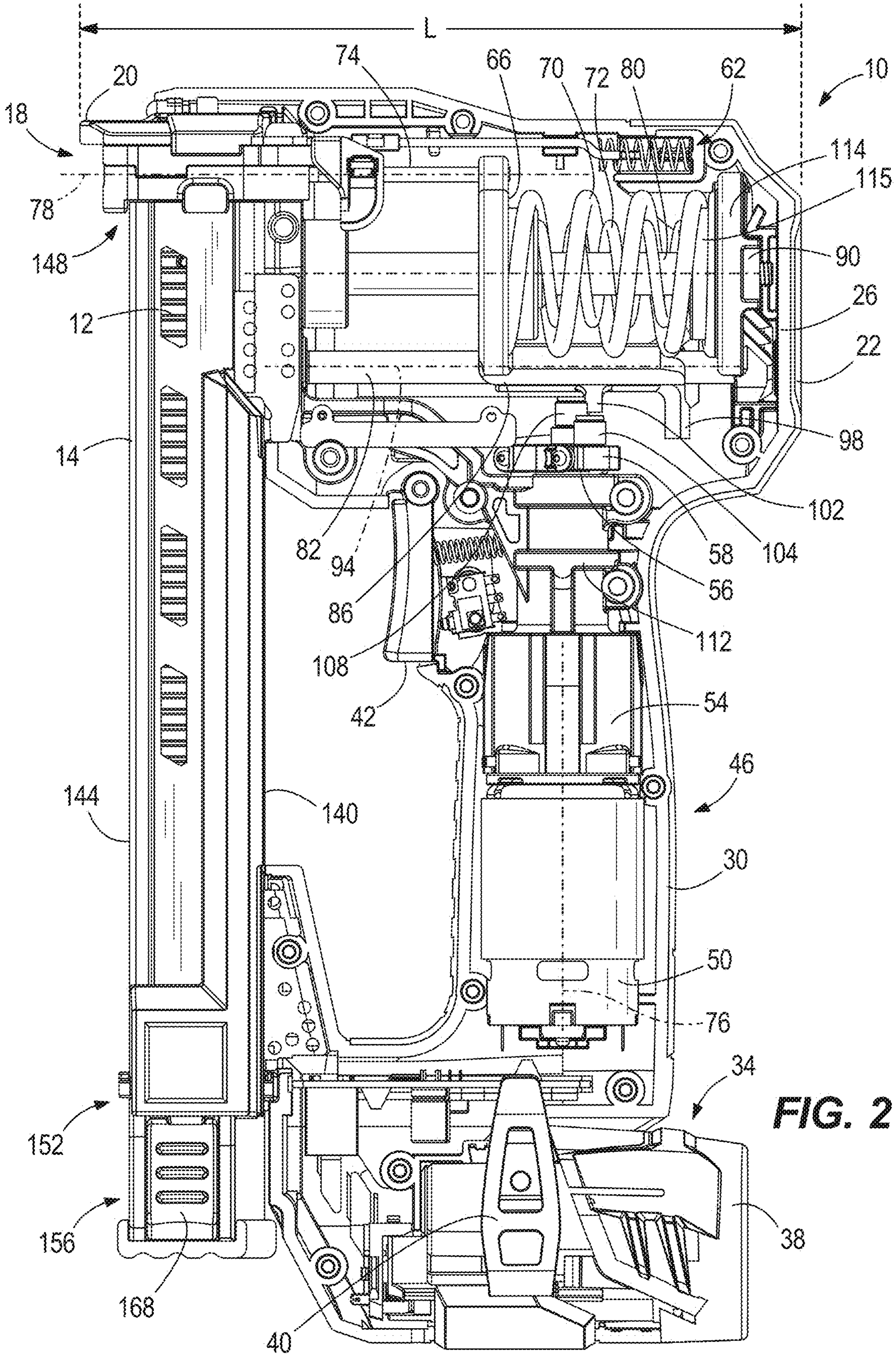
FIG. 2 is a side view of the powered fastener driver of FIG. 1, with portions removed for clarity, illustrating a drive mechanism, a firing mechanism, and a lifter assembly.

With reference to FIG. 2, the driver 10 includes a trigger 42 that selectively provides power to a drive mechanism 46 enclosed within the handle portion 30 of the driver 10. The drive mechanism 46 includes an electric motor 50, a gear box 54 that receives torque from the motor 50, and an output shaft 56 driven by the gear box 54. In some implementations, the motor 50 is a brushed DC motor that receives power from the battery pack 38. In some implementations of the driver 10, the motor 50 may be configured as a brushless direct current (DC) motor.

Figure 4:
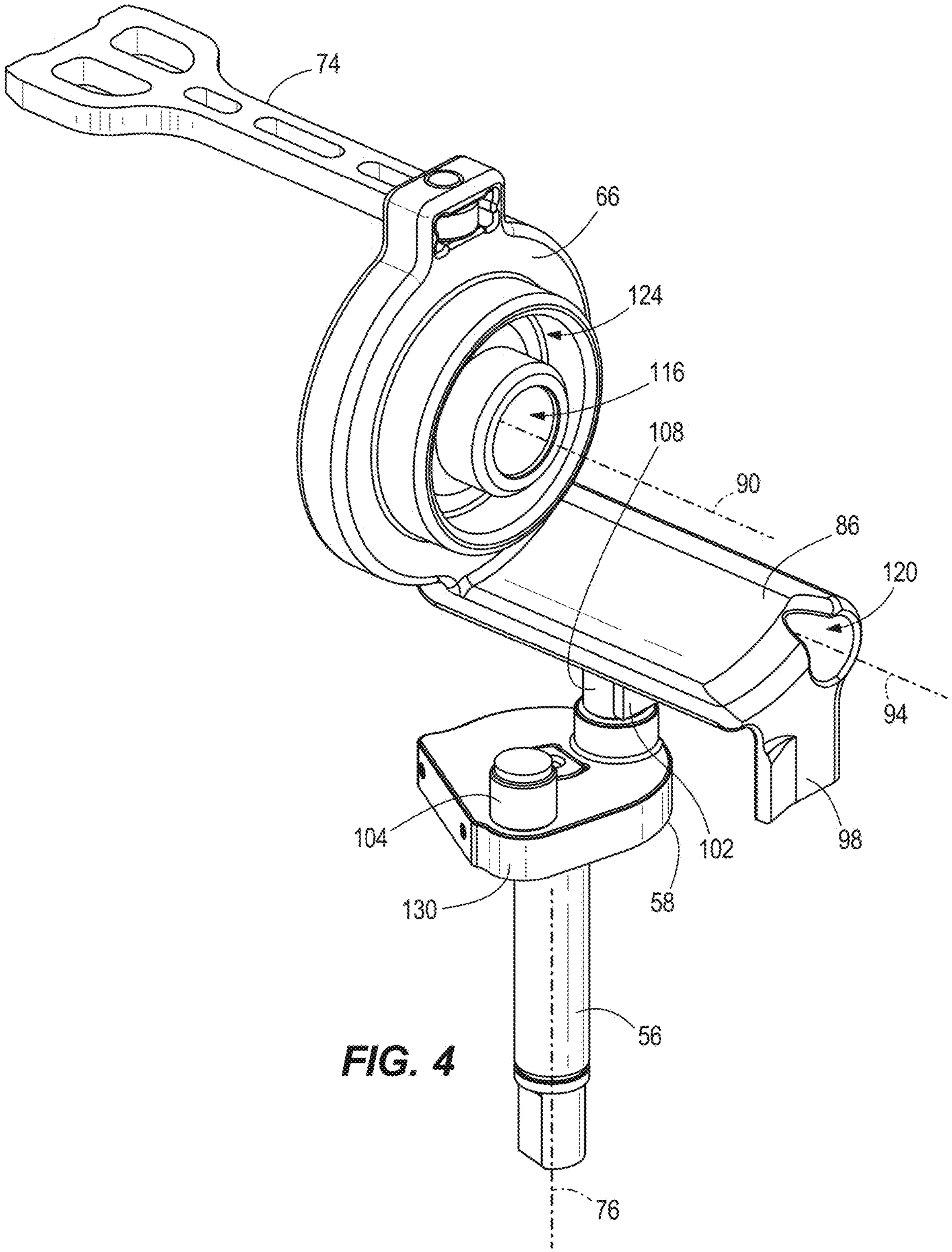
FIG. 4 is a perspective view of a portion of the lifter assembly and the firing mechanism of FIG. 3.

The powered fastener driver 10 includes a firing mechanism 62 within the head portion 26 of the housing 22. The firing mechanism 62 is coupled to the drive mechanism 46 and is operable to perform a fastener driving operation. The firing mechanism 62 includes a movable member (e.g., a piston 66) for reciprocal movement within the head portion 26, a biasing member (e.g., one or more compression springs 70, 72) seated against the piston 66, and a driver blade 74 attached to the piston 66 (FIG. 4). The biasing member 70 urges the piston 66 and the driver blade 74 within the head portion 26 towards a driven or bottom-dead center (BDC) position to drive the fastener 12 into the workpiece. In the illustrated implementation, the biasing member includes a nested pair of compression springs 70, 72 that act in unison to urge the piston 66 and the driver blade 74 towards the BDC position.

A lifter assembly 58 is positioned between the drive mechanism 46 and the firing mechanism 62 and is operated by the drive mechanism 46 to return the piston 66 and the driver blade 74 towards a top-dead center (TDC) position, against the bias of the biasing member 70. During a driving cycle, the biasing member 70 of the firing mechanism 62 urges the driver blade 74 and piston 66 from the TDC position towards the BDC position to fire a fastener into the workpiece. The lifter assembly 58, which is driven by the drive mechanism 46, is operable to move the piston 66 and the driver blade 74 from the BDC position toward the TDC position, stopping short of the TDC position at an intermediate ready position, so the firing mechanism 62 is ready for a subsequent fastener driving operation.

Figure 3:
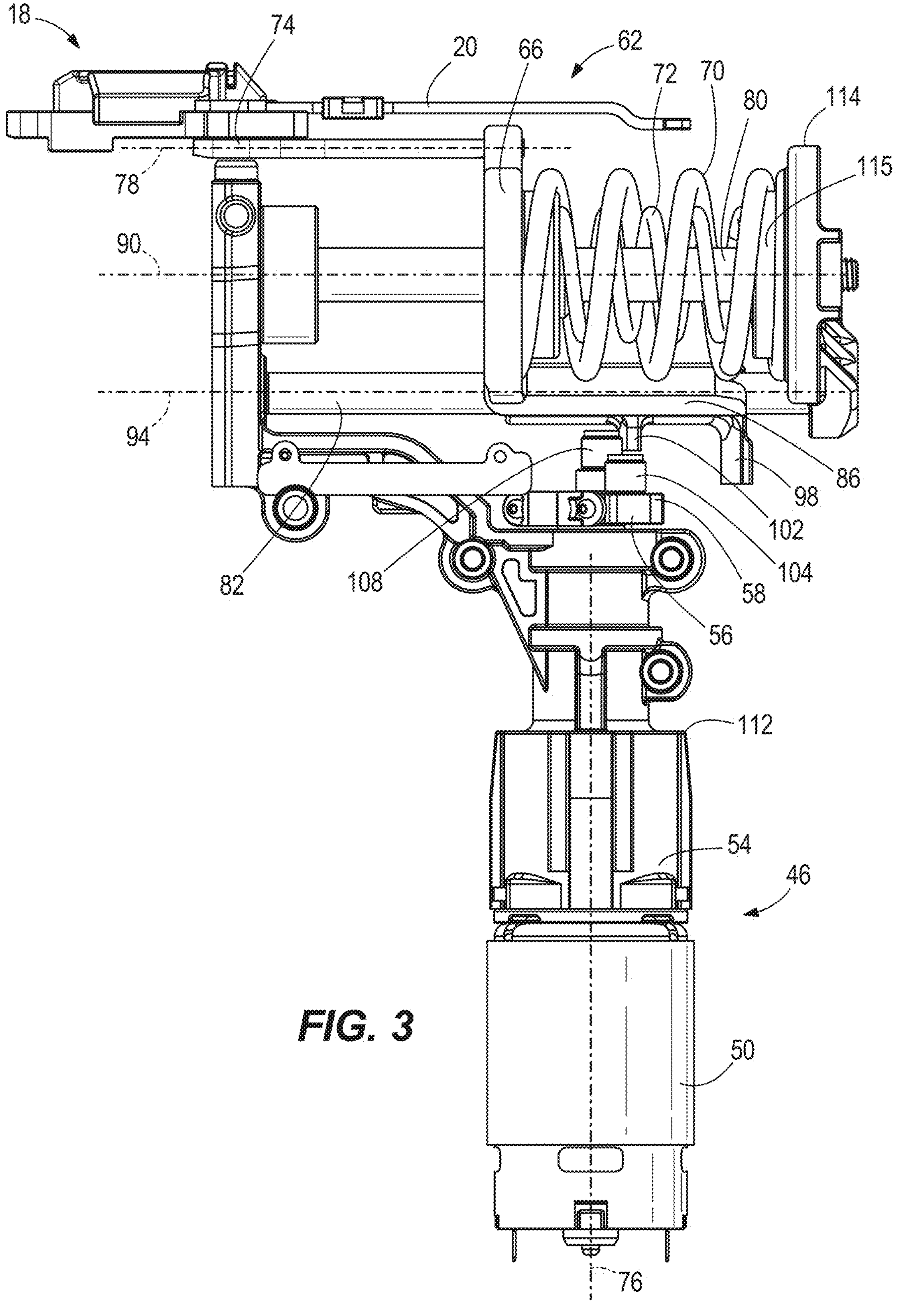
FIG. 3 is a side view of the drive mechanism, the firing mechanism, and the lifter assembly of the powered fastener driver of FIG. 1.

Now with reference to FIGS. 2 and 3, the driver 10 further includes a primary guide member (e.g., primary guide post 80) that slidably supports the piston 66 and a secondary guide member (e.g., secondary guide post 82), which slidably supports a bracket 86 coupled for movement with the piston 66, spaced from the primary guide post 80. The secondary guide post 82 is positioned between the primary guide post 80 and the lifter assembly 58 and is configured to slidably support the bracket 86. Because in the illustrated implementation the piston 66 and the bracket 86 are integrally formed as a single piece, both of the primary and secondary guide posts 80, 82 slidably support the piston 66. In the illustrated implementation, a primary guide axis 90 extends centrally through the primary guide post 80 and a secondary guide axis 94 extends centrally through the secondary guide post 82. The primary guide axis 90, the secondary guide axis 94, and the drive axis 78 are oriented parallel with each other and are each transverse to the motor axis 76. The primary and secondary guide posts 80, 82 are each cylindrical posts and each define guide surfaces that are devoid of any threads so the piston 66 can freely move along the primary and secondary guide posts 80, 82 in response to rotation of the lifter assembly 58

Now with reference to FIG. 4, the lifter assembly 58 and the piston 66 is illustrated in detail. The piston 66 defines a first bore 116 that is sized to receive and support the primary guide post 80 (FIG. 3) along the primary guide axis 90, a second bore 120 formed in the bracket 86, which is sized to receive and support the secondary guide post 82 (FIG. 3) along the secondary guide axis 94, and a cavity 124 surrounding the first bore 116 and sized to receive the biasing member 70 (FIG. 3). In the illustrated implementation, the bracket 86 is integrally formed with the piston 66. In other implementations, the bracket 86 may be formed separate from the piston 66 and may be coupled to the piston 66.

The bracket 86 includes a first protrusion 98 and a second protrusion 102 vertically spaced from the first protrusion 98 along the axis 94. The first and second protrusions 98, 102 each extend towards the lifter assembly 58. In the illustrated implementation, the first protrusion 98 extends further from the bracket 86 (e.g., towards the lifter assembly 58) than the second protrusion 102. In other words, the first protrusion 98 is longer than the second protrusion 102. The lifter assembly 58 includes a first eccentric pin 104 and a second eccentric pin 108 that selectively engage with a corresponding one of the first and second protrusions 98, 102 formed on the bracket 86 of the piston 66. In the illustrated implementation, the second eccentric pin 108 extends further from the lifter assembly 58 (e.g., towards the bracket 86) than the first eccentric pin 104 so the second eccentric pin 108 is sized to engage with the second protrusion 102. In other words, the second eccentric pin 108 is longer than the first eccentric pin 104. The construction of the lifter assembly 58 and the bracket 86 displaces the piston 66 and the driver blade 74 from the BDC position toward the TDC position during a single fastener driving cycle. Because the secondary guide post 82 is positioned adjacent and in close proximity to the lifter assembly 58 (e.g., in the bore 120), the physical deflection of the bracket 86, and thus the amount of bending stress experienced by the bracket 86, is reduced when the lifter assembly 58 moves the piston towards the TDC position.

With continued reference to FIGS. 2 and 3, the fastener driver 10 includes a frame 112 coupled to the housing 22 for supporting the lifter assembly 58 and a first end of each of the primary and secondary guide posts 80, 82. The frame 112 also defines a housing, which is a component of the gear box 54, in which a gear train (not shown) is located. In other words, the gear box 54 is integrally formed on the frame 112. The output shaft 56 extends through an aperture in the frame 112 with the lifter assembly 58 located adjacent and in close proximity to a vertical face of the frame 112 oriented perpendicular to the axis 76. An end cap 114 within the housing 22 supports an opposite, second end of each of the primary and secondary guide posts 80, 82. The end cap 114 includes a seat 115 (FIG. 3) against which a top end of the spring 70 is seated. The frame 112 is constructed as a single member, which supports the lifter assembly 58, while allowing rotatable movement of the lifter assembly 58, and rigidly supports the primary and secondary guide posts 80, 82 within the housing 22. In the illustrated implementation, the frame 112 has a first portion positioned within the head portion 26 of the housing 22 and a second portion positioned within the handle portion 30. The construction of the frame 112 allows the firing mechanism 62 and the drive mechanism 46 to be assembled separately (e.g., as shown in FIG. 3) and inserted within the housing 22. As a result, this allows for a more compact arrangement of the firing mechanism 62 and the drive mechanism 46, which reduces the overall size of the driver 10.

Now with reference to FIG. 2, the powered fastener driver 10 includes a length L defined between a front end of driver 10 (e.g., a front end of the contact trip 20) and a rear end of the housing 22 (e.g., the head portion 26). The length L of the driver 10 is less than or equal to 18 centimeters. In the illustrated implementation, the length L is 16.5 centimeters. In some implementations, the length L may be in a range from 12.5 centimeters to 18 centimeters. In some implementations, the length L may be in a range from 12.5 centimeters to 16.5 centimeters.

Figure 5:
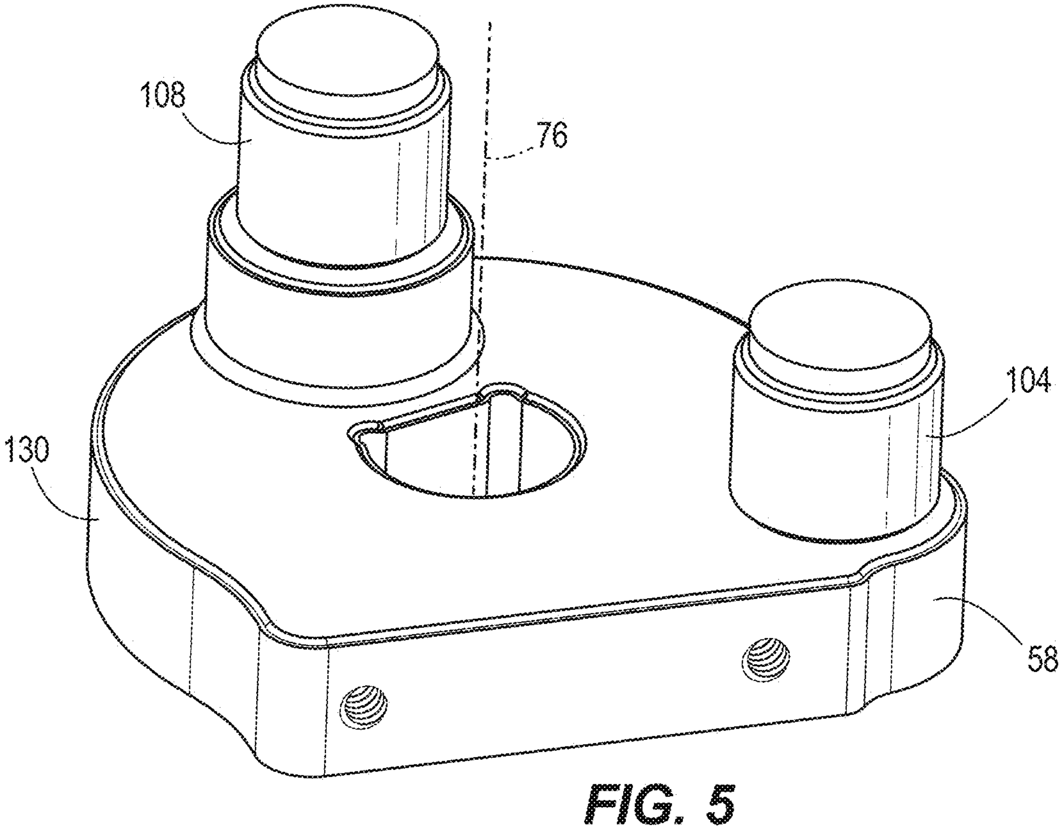
FIG. 5 is a perspective view of the portion of the lifter assembly shown in FIG. 4.
Figure 6:
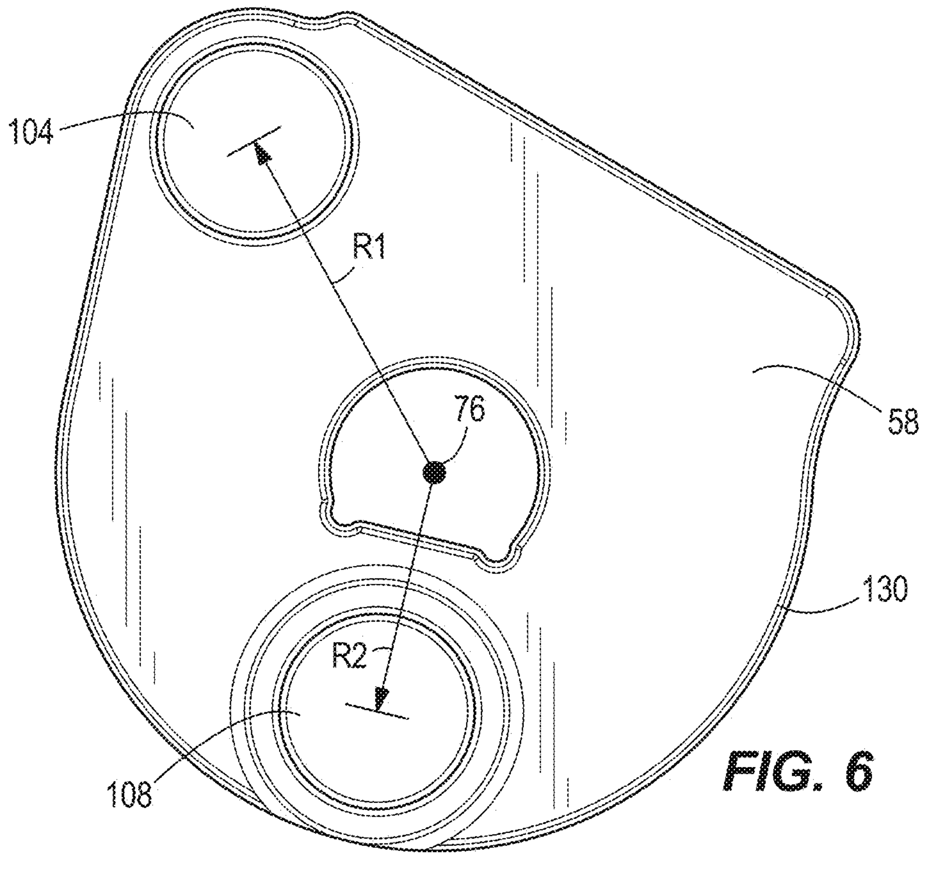
FIG. 6 is a top view of the portion of the lifter assembly shown in FIG. 5.

Now with reference to FIGS. 5 and 6, the lifter assembly 58 includes an outer circumferential surface 130. Each of the eccentric pins 104, 108 are arranged proximate the outer circumferential surface 130. In addition, the first eccentric pin 104 is positioned at a first radial distance R1 relative to a rotational axis of the lifter assembly 58 (i.e., the motor axis 76). The second eccentric pin 108 is positioned at a second radial distance R2 that is less than the first radial distance R1 of the first eccentric pin 104. As such, the eccentric pins 104, 108 of the lifter assembly 58 are positioned at different radial distances R1, R2 relative to the axis 76. In other words, the eccentric pins 104, 108 are radially offset with respect to each other.

Now with reference to FIG. 2, when the piston 66 is moved from the bottom-dead-center (BDC) position to the top-dead-center (TDC) position, the lifter assembly 58 rotates so the second eccentric pin 108 engages the second protrusion 102 of the bracket 86 of the piston 66. Because the second eccentric pin 108 is positioned at the smaller, second radial distance R2 than the first eccentric pin 104, less reaction torque is applied on the motor 50 by the spring 70 when the piston 66 is stationary in the ready position between the BDC and TDC positions. Additionally, because the first eccentric pin 104 is shorter than the second eccentric pin 108, during rotation of the lifter assembly 58, only the second eccentric pin 108 is capable of engaging the second protrusion 102. In other words, the first eccentric pin 104 has a first height and the second eccentric pin has a second height that is larger than the first height.

For example, the lifter assembly 58 is driven to rotate in a first direction by the drive mechanism 46 so the first and second eccentric pins 104, 108 engage the first and second protrusions 98, 102 in sequence, which returns the piston 66 and the driver blade 74 from the BDC position toward the TDC position. Since the radius R2 of the second eccentric pin 108 is smaller than the radius R1 of the first eccentric pin 104, the second eccentric pin 108 has a lower linear velocity than the linear velocity of the first eccentric pin 104 when the lifter assembly 58 is rotated by the motor 50. As a result, the higher linear velocity of the first eccentric pin 104 increases firing speeds by returning the piston 66 to the TDC position faster while the lower linear velocity of the second eccentric pin 108 reduces the reaction torque on the motor 50.

Figure 7:
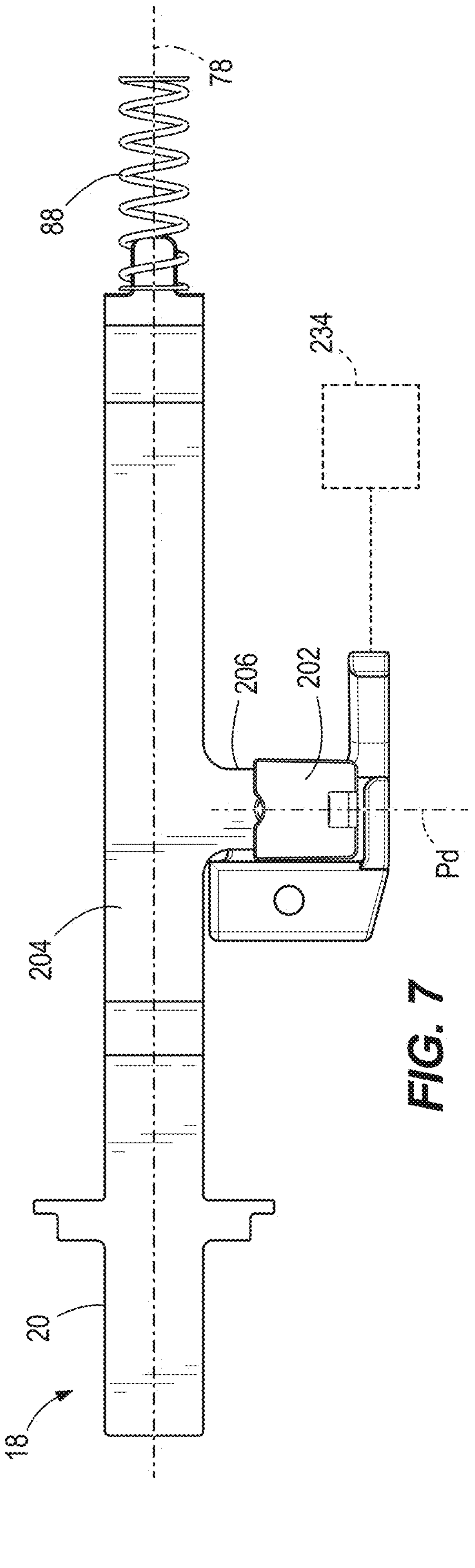
FIG. 7 is a top view of a contact trip of the powered fastener driver of FIG. 1, illustrated in a first position.
Figure 8:
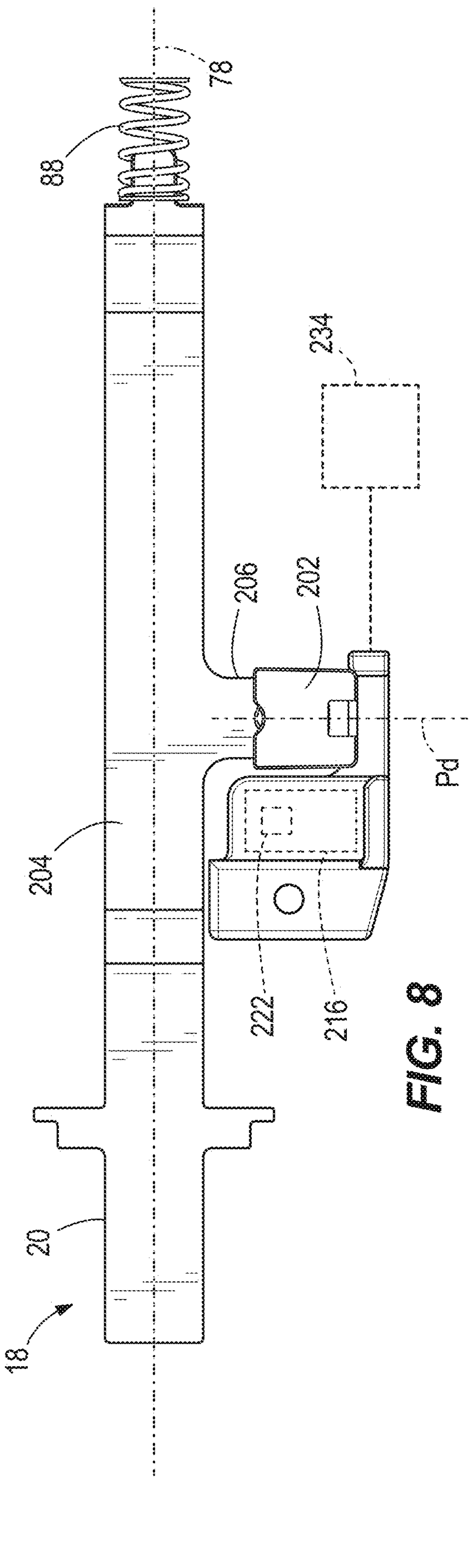
FIG. 8 is a top view of the contact trip of the powered fastener driver of FIG. 1, illustrated in a second position.

With reference to FIGS. 7-8, the contract trip 20 is configured to move from a first position (FIG. 7) to a second position (FIG. 8) in response to engagement with a workpiece. A biasing member 88, such as a spring, biases the contact trip 20 to the first position. In the illustrated implementation, the biasing member 88 includes a coil spring; however, other types of biasing members, such as resilient material, or other types of springs may be employed. The contact trip 20 is configured to support a magnet 202 such that the magnet 202 moves fixedly with the contact trip 20 relative to the housing 22 between the first position (FIG. 7) and the second position (FIG. 8). The contact trip 20 may include a main body 204 elongated generally parallel to the drive axis 78 and a support portion 206 extending laterally from the main body 204 transverse to the main body 204. The support portion 206 may extend generally perpendicularly from the main body 204, or at any angle in other implementations. The support portion 206 may be disposed in generally the same plane as the main body 204, as illustrated, or may be offset (e.g., stepped) from the main body 204 in a parallel plane spaced from the main body 204, or may be offset from the main body 204 in a plane transverse to the main body 204 (e.g., ramped with respect to the main body 204) in other implementations. The support portion 206 may be formed as a unitary body with the main body 204. The support portion 206 supports the magnet 202 such that the magnet 202 moves fixedly with the contact trip 20. The magnet 202 may have any suitable shape and is not limited to the generally rectangular shapes illustrated herein. The powered fastener driver 10 includes a sensor 222 configured to sense the magnet 202. For example, the sensor 222 senses proximity of a pole junction (which will be described in greater detail below) of the magnet 202. The sensor 222 is supported fixedly with respect to the housing 22. In other implementations, the magnet 202 may be supported fixedly with respect to the housing 22 and the contact trip 20 may be configured to support the sensor 222 to move fixedly with the contact trip 20.

It should be understood that the magnet 202 and the sensor 222 may be similarly arranged on any part of any power tool. The powered fastener driver 10 is one example of a power tool and may be employed to drive staples, nails, tacks, rivets, or other types of fasteners into a workpiece. The magnet 202 may also be coupled to any movable member (movable between a first position with respect to the housing 22 and a second position with respect to the housing 22) in any other type of power tool such as, but not limited to, impact drivers, impact wrenches, drills, oscillating tools, band saws, reciprocating saws, circular saws, miter saws, other saws, threaders, vacuums, rotary hammers, grinders, drum machines, ratchets, etc. The movable member includes any piece of material that is movable with respect to the housing of the power tool between the first position and the second position. The piece of material may include a rigid body that translates (e.g., slides) between the first and second positions, a rigid body that rotates, pivots, rocks, etc., between the first and second positions, a flexible body that flexes between the first and second positions, a cantilevered body that flexes between the first and second positions, a resilient body that deforms elastically between the first and second positions, a compressible body that deforms elastically between the first and second positions, etc. The contact trip 20 is only one example of the movable member. The sensor 222 provides a signal to the controller 234 that may be used to control any aspect of the power tool. Controlling the motor 50 is provided herein as one example. Controlling the motor 50 may include activating the motor, deactivating the motor, stopping the motor, controlling a speed of the motor, controlling a direction of the motor, etc. Other functions of the power tool may be controlled in other implementations, such as a mode, a signal, a light, a direction, a speed, a depth, a distance, and so on.

The sensor 222 is configured to sense the position of the magnet 202 and therefore the position of the contact trip 20. A controller 234, illustrated schematically in FIGS. 7-8, is configured to receive a signal from the sensor 222 and to control the motor 50 in response to the signal. The signal is indicative of the position of the magnet 202, and therefore the position of the contact trip 20. More specifically, the controller 234 may be configured to deactivate the motor 50 in response to the signal indicating that the contact trip 20 is in the first position. Deactivating the motor 50 may include not allowing the motor 50 to be activated (e.g., powered) in response to the trigger 42 being actuated. For example, power is inhibited from activating the motor 50 even when the trigger 42 is actuated. Deactivation of the motor 50 is a safety feature that inhibits release of a fastener when the nosepiece 18 is not being engaged with a workpiece. The controller 234 may be configured to allow activation of the motor 50 when the contact trip 20 is not in the first position, e.g., when the contact trip 20 is in the second position, which may include any desired position that is not the first position. Activation of the motor 50 may be allowed by the controller 234 when the contact trip 20 is sensed by the sensor 222 to no longer be in the first position. In other implementations, activation of the motor 50 may be allowed by the controller 234 when the contact trip 20 is sensed to be in the second position, e.g., by a second sensor (not shown, but essentially structurally the same as the sensor 222 and disposed in a location suitable for sensing the magnet 202 in the second position). Actuation of the trigger 42 while activation of the motor 50 is allowed results in power being provided to the motor 50 to operate the motor 50. Thus, when the nosepiece 18 is engaged with a workpiece and the contact trip 20 is depressed to the second position (or simply to a non-first position), activation of the motor 50 will be allowed to proceed when the trigger 42 is actuated.

Figure 9:
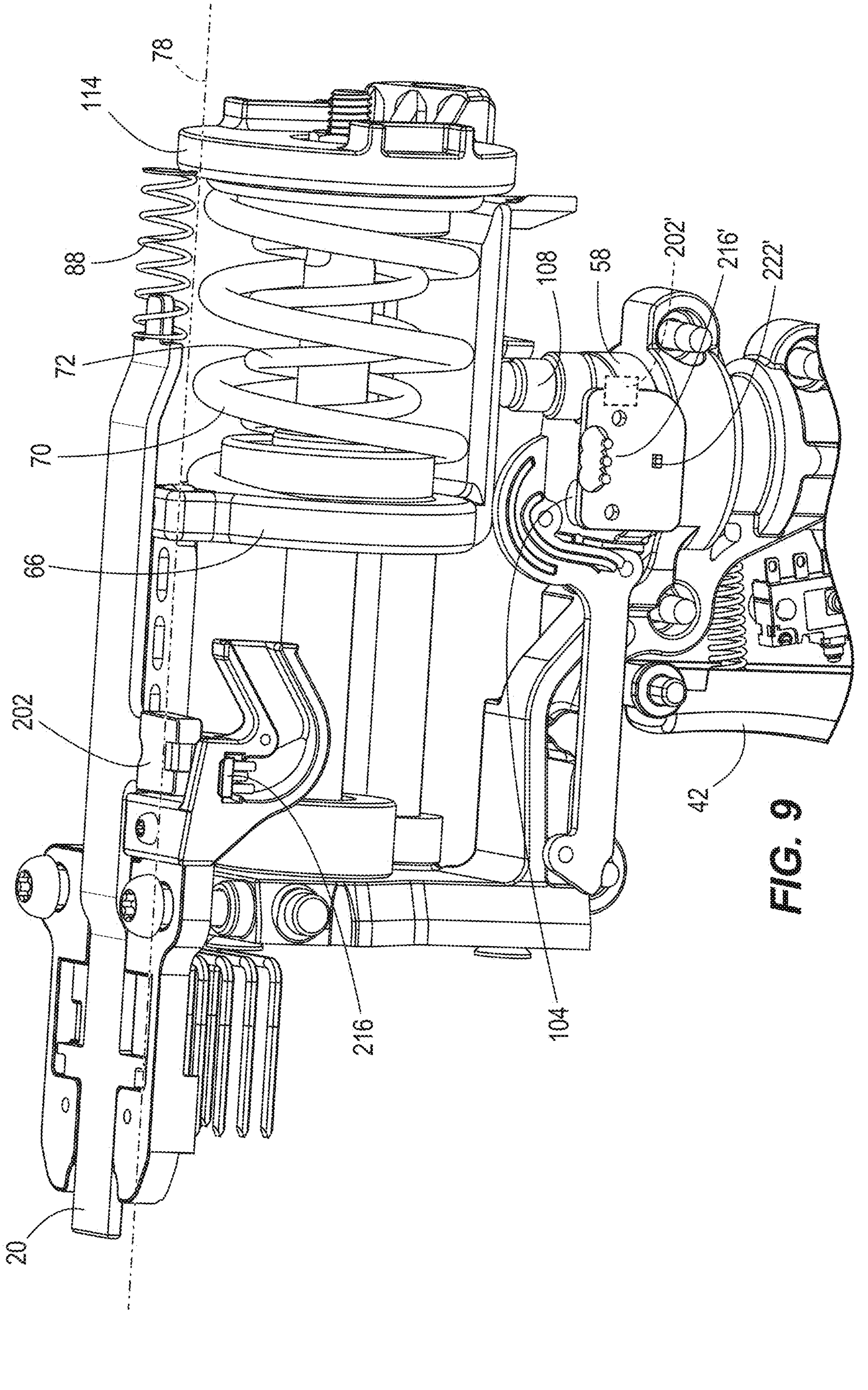
FIG. 9 is a perspective view of a portion of the powered fastener driver of FIG. 1 illustrating the lifter assembly and the contact trip.
Figure 10:
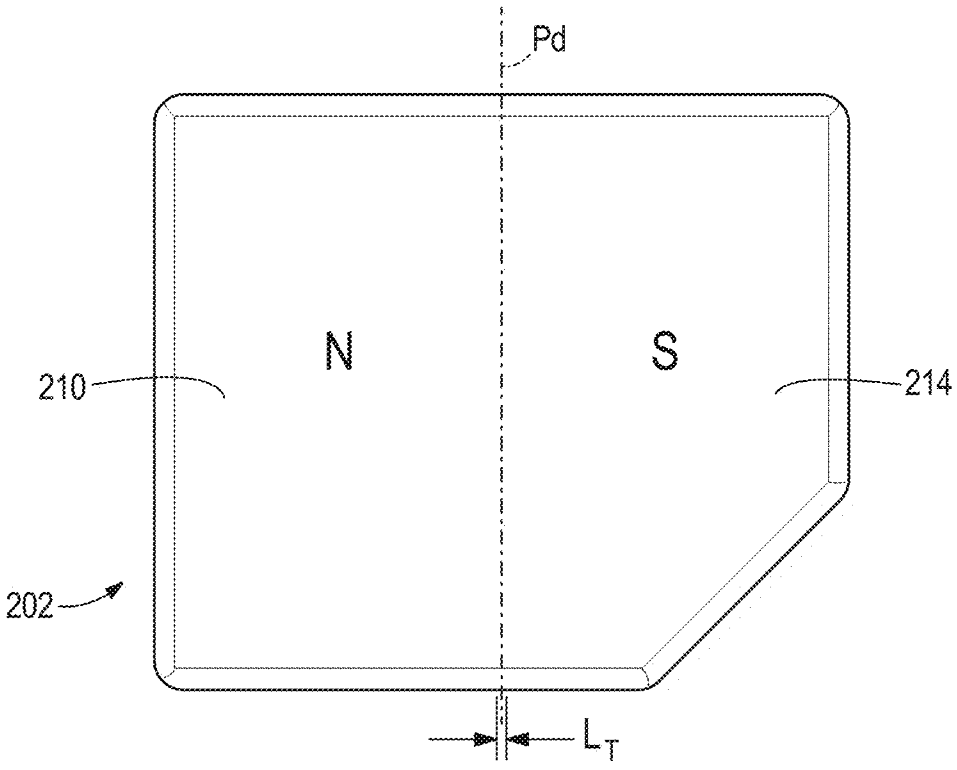
FIG. 10 is a plan view of a magnet of the powered fastener driver of FIG. 1.
Figure 11:
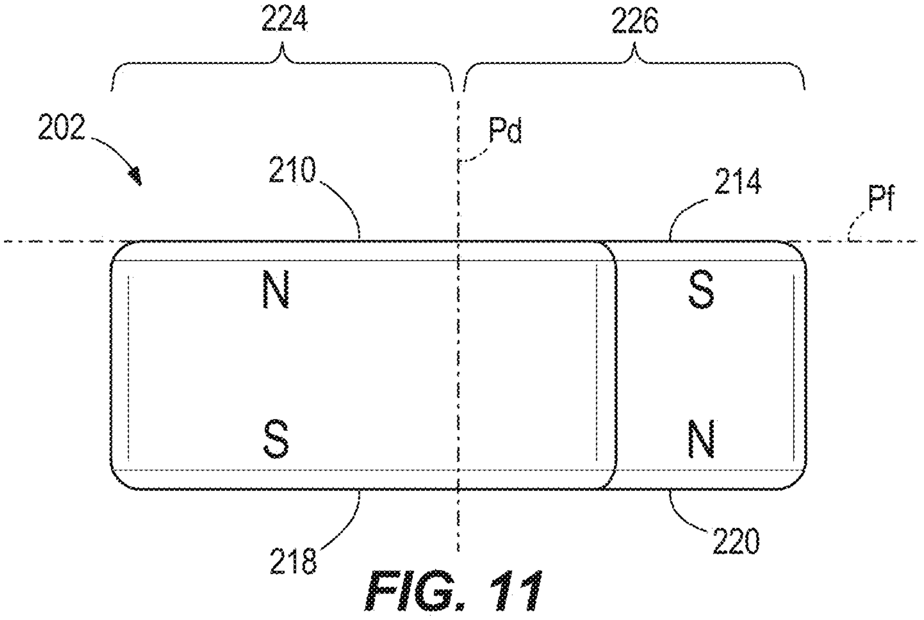
FIG. 11 is an elevation view of the magnet of FIG. 10.

With reference to FIGS. 10-11, the magnet 202 is a multi-pole magnet, which includes two or more pairs of poles (e.g., see first and second pairs of poles 224, 226 described below) and is formed as a single piece having the two or more pairs of poles. The magnet 202 includes a North pole face 210 and an adjacent South pole face 214, each from a different pair of poles. In the illustrated implementation, the North and South pole faces 210, 214 are coplanar, with the North and South pole faces 210, 214 collectively defining a face plane µF (FIG. 11) that is parallel to the drive axis 78. The North pole face 210 is separated from the South pole face 214 by a pole junction (indicated by plane $P_D$) that is perpendicular to the drive axis 78. The pole junction $P_D$ separates one pair of poles (e.g., the first pair of poles 224) from another pair of poles (e.g., the second pair of poles 226). Both of the North and South pole faces 210, 214 are in facing relationship with a printed circuit board (PCB) 216 (FIG. 9) that is parallel to the drive axis 78. As shown in FIG. 11, the magnet 202 includes a second South pole face 218 on a side of the magnet 202 opposite the North pole face 210 and a second North pole face 220 on the side of the magnet 202 opposite the South pole face 214. The direction of orientation of magnetic field lines in the magnet 202 is generally parallel to the pole junction $P_D$. More specifically, magnetic field lines run from the North pole face 210 to the South pole face 218, which defines the first pair of poles 224, and magnetic field lines run from the North pole face 220 to the South pole face 214, which defines the second pair of poles 226. The orientation of the polarity of the magnetic field lines in the first pair of poles 224 is opposite the orientation of the polarity of the magnetic field lines in the second pair of poles 226.

Even more specifically, the magnet 202 is formed as one piece including two or more pairs of poles (e.g., the first pair of poles 224 including the North pole face 210 and the South pole face 218, and the second pair of poles 226 including the North pole face 220 and the South pole face 214, and in some constructions may include any number of further pairs of poles magnetized into the single-piece magnet 202). The two or more pairs of poles 224, 226 are magnetized into the single-piece magnet 202. That is, rather than magnetizing each pair of poles 224, 226 in a separate magnet and fastening the magnets together, magnetizing (e.g., double-magnetizing, triple-magnetizing, or quadruple-magnetizing, etc.) the single-piece magnet 202 during or after formation of the single-piece of material of the entire magnet 202 creates a shorter transition length $L_T$ at the pole junction $P_D$. In other words, the length of the transition between the North pole face 210 and the adjacent South pole face 210 is smaller such that the magnetic field lines extending normal to the North pole face 210 and the South pole face 214 are closer together than has been achieved by fastening two separately-magnetized magnets together. The transition length $L_T$ may be measured as a linear distance in the face plane $P_F$ crossing the pole junction $P_D$. The transition length $L_T$ may be measured in a linear direction that is parallel with the direction of movement of the magnet 202. This creates the unique pole junction $P_D$ that advantageously allows more precise signaling position of the magnet 202 (and any movable member to which the magnet 202 is coupled) in accordance with the disclosure. Specifically, the precise location of the pole junction $P_D$ can be sensed by the sensor 222 within a narrower range of positions because the linear transition length $L_T$ between North pole flux from the North pole face 210 and South pole flux from the South pole face 214 is surprisingly small. (In other words, the signaling position is more precisely defined.) Thus, any control functions triggered by, or dependent on, the location of the magnet 202 are more precisely initiated.

The single-piece magnet 202 is also easier to dispose in the power tool 10 during assembly. In contrast, placing separate pieces of magnetized material (i.e., separate magnets) next to each other during assembly may be challenging due to the electromagnetic forces repelling and attracting the magnets with respect to each other. For example, the North pole face 210 and the South pole face 214 may have a tendency to snap together due to magnetic forces of attraction, making it difficult to assemble (insert, orient, and secure) the North pole face 210 adjacent to the South pole face 214 as described and illustrated herein. Additional steps, processes, time, labor, and/or materials may be required to assemble multiple magnets in close proximity to each other. Thus, cost savings may also be realized as a result of the magnet 202 being formed and magnetized as a single piece of material having two or more pairs of poles.

When the contact trip 20 is in the first position (FIG. 7), the magnet 202 is proximate the sensor 222 on the PCB 216. As described in further detail below, the sensor 222 is configured to detect presence of the magnet 202 when the contact trip 20 is in the first position. More specifically, the sensor 222 detects the pole junction (indicated by plane $P_D$), as will be described in greater detail below. When the contact trip 20 is in the second position (FIG. 8), the magnet 202 is spaced from the sensor 222. In the illustrated implementation, the sensor 222 is a Hall-effect sensor. The sensor 222 may be a North or South pole-detecting Hall-effect sensor. As discussed briefly above, in other implementations, two or more sensors 222 may be employed, such as one North pole-detecting Hall-effect sensor and one South pole-detecting Hall-effect sensor. A North pole-detecting Hall-effect sensor includes logic that filters for the desired polarity, in this case North. A South pole-detecting Hall-effect sensor includes logic that filters for the desired polarity, in this case South. Thus, the one or more sensors 222 may be configured to send a signal to the controller 234 based on the detected polarity (e.g., whether the voltage across the Hall-effect sensor is positive or negative) in addition to the detected magnitude. In contrast, a typical Hall-effect sensor may only output a magnitude and therefore may not be capable of distinguishing the polarity. Thus, a typical Hall-effect sensor may not be capable of detecting a difference between North pole flux and South pole flux and therefore may not be capable of sending signals to the controller 234 based on whether North pole flux or South pole flux is detected.

When the contact trip 20 reaches the first position (FIG. 7), the sensor 222 detects that the pole junction $P_D$ has reached the signaling position with respect to the sensor 222. Specifically, the sensor 222 detects that the pole junction $P_D$ has reached the signaling position because the detected pole flux drops to zero, due to the South pole magnetic flux from the South pole face 214 canceling out the North pole magnetic flux from the North pole face 210. In some implementations, the signaling position is defined by the position of the magnet 202 when the pole junction $P_D$ intersects a center of the sensor 222. In other implementations, the signaling position is defined by the position of the magnet 202 when the pole junction $P_D$ is offset from the center of the sensor 222, taking into account the following factors: (1) timing of the signal sent from the sensor 222 to the controller 234; (2) electronic logic delay of the controller 234 to interpret the signal received from the sensor 222 to determine that the contact trip 20 has reached the first position; and (3) the speed of movement of the contact trip 20 as it travels toward the first position.

In response to the sensor 222 outputting a signal to the controller 234 that indicates that the detected pole flux has dropped to zero (e.g., a predetermined flux), the controller 234 deactivates the motor 50, thus not allowing a fastener to be dispensed. In contrast to including a magnet with a single-pole face (e.g., a North pole) in facing relationship with the PCB 216 and the sensor 222, because the magnet 202 has a North pole face 210 and South pole face 214 in facing relationship with the PCB 216, the sensor 222 is able to more precisely detect when the contact trip 20 has reached the first position by detecting when the pole flux has dropped to zero. Hall-effect sensors detecting a single-pole face of a magnet are more susceptible to variation of detected magnetic flux based on the distance separating the single-pole face magnet from the Hall-effect sensor. By more precisely determining when the contact trip 20 has reached the first position, potential damage due to overtravel throughout the entire range of mechanical stackups is reduced.

The controller 234 may be configured to allow activation of the motor 50 in response to a signal from the sensor 222 corresponding to a non-zero value of flux. The triggering non-zero value to may be any value greater than zero, or may be a predetermined non-zero value programmed into the controller 234 to trigger allowing activation of the motor 50. In other implementations, the triggering flux value may be provided by the second sensor (not shown but discussed above). The triggering flux value may be zero flux corresponding to the second sensor detecting that the pole junction $P_D$ has reached a signaling position for the second sensor.

It should be understood that other configurations of North and South pole faces and North and/or South pole detecting Hall-effect sensors may be employed in other arrangements in order to detect the pole junction $P_D$ reaching a signaling position based on either increasing flux strength from zero or decreasing flux strength towards zero. In some implementations, the magnet may include two or more pole junctions $P_D$. For example, the magnet 202 may include three, four, or any number of coplanar pole faces 210, 214 (e.g., alternating North and South in series along a length of the magnet 202) defining a pole junction $P_D$ between each adjacent pair of coplanar poles 210, 214. In such implementations with multiple pole junctions $P_D$, Hall effect sensors 222 having the same pole-detection capabilities (e.g., both North pole detecting or both South pole detecting, rather than one North pole detecting and one South pole detecting) could be disposed at the first and second positions. In any implementation, the signal for deactivating the motor 50 may be generated based on the flux strength reaching (e.g., decreasing to or increasing to) a threshold value, which may be zero or a non-zero value, and may rely on whether the flux strength has reached zero and then subsequently risen.

By including a single-piece magnet 202 with North pole and South pole faces 210, 214 with the pole junction $P_D$ therebetween, the sensor 222 has a more precise sensing window in determining when the contact trip 20 has reached the first and/or second position. Thus, the controller 234 is able to more precisely control the motor 50, achieving a benefit that is normally only available with traditional limit switches, while increasing the longevity of the components, as the magnet 202 in combination with the sensor 222 has greater longevity than traditional limit switches. In other implementations, the magnet 202 with North pole and South pole faces 210, 214 can be used in other applications and tools where precise sensing windows are necessary.

For example, in some implementations, a magnet 202' (illustrated schematically in FIG. 9) and a sensor 222' may be coupled to the lifter assembly 58, as illustrated in FIG. 9. The magnet 202' and the sensor 222' are the same as the magnet 202 and the sensor 222 described herein and need not be described again. Reference is made to the description of the magnet 202 and the sensor 222 herein. The magnet 202' and the sensor 222' may be provided in addition to, or instead of, the magnet 202 and the sensor 222. The sensor 222' is disposed on a PCB 216' and operatively coupled to the controller 234 to send a signal thereto. In the illustrated implementation, the magnet 202' may be coupled to the lifter assembly 58 for rotation with the lifter assembly 58 and the sensor 222' may be disposed adjacent the lifter assembly 58, fixed with respect to the housing 22, to detect the magnet 202' in the same fashion as described herein with respect to the sensor 222 and the magnet 202. The magnet 202' may be coupled to the outer circumferential surface 130 of the lifter assembly 58, or to any other suitable surface of the lifter assembly 58. In other implementations, the magnet 202' may be disposed adjacent to the lifter assembly 58 and the sensor 222' may be coupled to the lifter assembly 58.

More specifically, the magnet 202' may be positioned such that sensor 222' detects the intermediate ready position (described above) of the lifter assembly 58. In the intermediate ready position, the spring 70 is at least partially loaded and rotation of the motor 50 is stopped. In the intermediate ready position, the firing mechanism 62 is ready for a subsequent fastener driving operation. The controller 234 is configured to stop rotation of the motor 50 when the lifter assembly 58 reaches the intermediate ready position. The controller 234 may be configured to stop rotation of the motor 50 in response to the signal from the sensor 222'. At this point in the drive cycle, the lifter assembly 58 is ready to drive the fastener in response to subsequent actuation of the trigger 42 with the motor 50 allowed to be activated (which depends on the position of the contact trip 20 as described herein).

In yet other implementations, the single-piece magnet 202 with multiple pairs of poles may be disposed on any part of any power tool. The location of the single-piece magnet 202 may be sensed by the sensor 222 disposed on any part of any power tool. The controller 234 may be programmed to initiate any control scheme dependent on the position of the magnet 202 and/or the sensor 222.

In operation, the operator presses the nosepiece 18 of the powered fastener driver 10 into engagement against a workpiece, thereby depressing the contact trip 20 to move the contact trip 20 from the first position towards the second position. With the contact trip 20 no longer in the first position (or in the second position in some implementations), the motor 50 is allowed to be activated when the operator actuates the trigger 42. When the operator removes the powered fastener driver 10 from engagement with the workpiece, the contact trip 20 returns to the first position, biased by the biasing member 88, and the motor 50 is deactivated such that actuation of the trigger 42 cannot power the motor 50.

In response to actuation of the trigger 42, the motor 50 rotates through a drive cycle. Each drive cycle starts and ends with the piston 66 and the driver blade 74 in the intermediate ready position, which is between the BDC and TDC positions, and may be closer to the TDC position, with the biasing member 70 at least partially loaded. In order to end the drive cycle, rotation of the motor 50 is stopped by the controller 234 in response to the signal from the sensor 222'. When trigger 42 is actuated to initiate a subsequent, second drive cycle, the lifter assembly 58 is again rotated by the motor 50 through the TDC position, which releases the biasing member 70 and drives the piston 66 and the driver blade 74 toward the BDC position, which causes the driver blade 74 to move along the drive axis 78 with the spring force, thereby driving the fastener 12 into the workpiece. Following the release of the biasing member 70, the lifter assembly 58 returns the piston 66 to the intermediate ready position in preparation for another subsequent drive cycle. Each time the sensor 222' detects the lifter assembly 58 in the intermediate ready position, the controller 234 stops rotation of the motor 50 and is configured to initiate rotation of the motor 50 in a new drive cycle when the contact trip 20 is depressed and the trigger 42 is subsequently actuated.

Although the disclosure has been described in detail with reference to certain preferred implementations, variations and modifications exist within the scope and spirit of one or more independent aspects of the disclosure as described. For example, the magnet 202 and the sensor 222 may be employed with other types of power tools to more accurately sense the position of any movable part therein.

Thus, the disclosure provides a more accurate position-sensing mechanism employing a multi-pole magnet 202 and sensor 222 configured to detect the pole junction of the multi-pole magnet 202.

What is claimed is:

1. A powered fastener driver, comprising:
a motor;
a lifter configured to be rotatable by the motor about a rotational axis;
a piston urged towards a bottom-dead-center position to drive the fastener into a workpiece;
a magnet coupled to the lifter for rotation with the lifter, the magnet including a first pair of poles including a first north pole face and a first south pole face, and a second pair of poles including a second north pole face and a second south pole face, wherein the first north pole face is adjacent the second south pole face, and wherein a pole junction is defined between the first pair of poles and the second pair of poles;
a sensor configured to detect the pole junction; and
a controller configured to control the motor based on detection of the pole junction.

2. The powered fastener driver of claim 1, wherein the pole junction is configured to be detected by the sensor when the lifter reaches an intermediate ready position, and wherein the controller is configured to stop the motor in response to the lifter reaching the intermediate ready position.

3. The powered fastener driver of claim 1, wherein the magnet is disposed on an outer circumference of the lifter.

4. The powered fastener driver of claim 1, wherein the first north pole face and the first south pole face are each configured to face the sensor.

5. The powered fastener driver of claim 1, wherein the sensor is a North pole-detecting Hall-effect sensor configured to filter for North pole flux or a South pole-detecting Hall-effect sensor configured to filter for South pole flux.

6. The powered fastener driver of claim 1, wherein the lifter includes first and second eccentric pins configured to selectively engage the piston, wherein the first eccentric pin is disposed a first radial distance with respect to the rotational axis, wherein the second eccentric pin is disposed a second radial distance with respect to the rotational axis, and wherein the first and second radial distances are different from each other.

7. The powered fastener driver of claim 6, wherein the first eccentric pin is shorter than the second eccentric pin.

8. A powered fastener driver, comprising:
a motor;
a contact trip configured to be movable from a first position to a second position in response to engagement with a workpiece;
a magnet coupled to the contact trip for movement with the contact trip, the magnet including a first pair of poles including a first north pole face and a first south pole face, and a second pair of poles including a second north pole face and a second south pole face, wherein the first north pole face is adjacent the second south pole face, and wherein a pole junction is defined between the first pair of poles and the second pair of poles;
a sensor configured to detect the pole junction; and
a controller configured to deactivate the motor to inhibit release of a fastener when the contact trip is in the first position based on detection of the pole junction.

9. The powered fastener driver of claim 8, wherein the pole junction is configured to be detected by the sensor when the contact trip is in the first position, wherein the controller is configured to deactivate the motor in response to the contact trip being in the first position.

10. The powered fastener driver of claim 8, wherein the pole junction is configured to be detected by the sensor when the contact trip is in the second position, wherein the controller is configured to allow activation of the motor in response to the contact trip being in the second position.

11. The powered fastener driver of claim 8, wherein the first north pole face and the first south pole face are each configured to face the sensor.

12. The powered fastener driver of claim 8, wherein the sensor is a North pole-detecting Hall-effect sensor configured to filter for North pole flux or a South pole-detecting Hall-effect sensor configured to filter for South pole flux.

13. The powered fastener driver of claim 8, wherein the contact trip includes a main body elongated generally parallel to a fastener drive axis, and a support portion extending from the main body, the support portion configured to support the magnet such that the magnet moves fixedly with the contact trip.

14. The powered fastener driver of claim 13, wherein the support portion extends laterally from the main body.

15. The powered fastener driver of claim 8, wherein the magnet includes a third pair of poles and a second pole junction.

16. A powered fastener driver, comprising:

a motor;

a lifter configured to be rotatable by the motor about a rotational axis;

a piston urged towards a bottom-dead-center position to drive the fastener into a workpiece;

a contact trip configured to be movable from a first position to a second position in response to engagement with the workpiece;

a first magnet coupled to the lifter for rotation with the lifter, the first magnet including a first pair of poles, a second pair of poles, and a first pole junction therebetween;

a first sensor configured to detect the first pole junction;

a second magnet coupled to the contact trip for movement with the contact trip, the second magnet including a third pair of poles, a fourth pair of poles, and a second pole junction therebetween;

a second sensor configured to detect the second pole junction; and a controller configured to stop the motor based on a position of the first pole junction, and configured to deactivate the motor to inhibit release of a fastener based on a position of the second pole junction.

17. The powered fastener driver of claim 16, further comprising a trigger configured to actuate the motor, wherein the controller is further configured stop the motor based on the position of the first pole junction when the first sensor detects the lifter in an intermediate ready position, and is further configured to initiate rotation of the motor in a new drive cycle when the second sensor detects the contact trip is moved out of the first position and the trigger is subsequently actuated.

18. The powered fastener driver of claim 16, wherein the first sensor is a North pole-detecting Hall-effect sensor configured to filter for North pole flux or a South pole-detecting Hall-effect sensor configured to filter for South pole flux, and wherein the second sensor is a North pole-detecting Hall-effect sensor configured to filter for North pole flux or a South pole-detecting Hall-effect sensor configured to filter for South pole flux.

19. The powered fastener driver of claim 16, wherein the lifter includes first and second eccentric pins configured to selectively engage the piston, wherein the first eccentric pin is disposed a first radial distance with respect to the rotational axis, wherein the second eccentric pin is disposed a second radial distance with respect to the rotational axis, wherein the first and second radial distances are different from each other, and wherein the first eccentric pin is shorter than the second eccentric pin.

20. The powered fastener driver of claim 16, wherein the contact trip includes a main body elongated generally parallel to a fastener drive axis, and a support portion extending from the main body, the support portion configured to support the second magnet such that the second magnet moves fixedly with the contact trip.

* * * * *